(12) United States Patent
Yeh et al.

(10) Patent No.: US 11,372,862 B2
(45) Date of Patent: Jun. 28, 2022

(54) SYSTEM AND METHOD FOR INTELLIGENT KNOWLEDGE ACCESS

(71) Applicant: Nuance Communications, Inc., Burlington, MA (US)

(72) Inventors: Peter Yeh, Milpitas, CA (US); Ezra Story, Seattle, WA (US); Prateek Jain, San Jose, CA (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 181 days.

(21) Appl. No.: 15/785,354

(22) Filed: Oct. 16, 2017

(65) Prior Publication Data
US 2019/0114327 A1   Apr. 18, 2019

(51) Int. Cl.
G06F 16/2457 (2019.01)
G06N 5/04 (2006.01)
G06F 16/2455 (2019.01)
G06F 16/2452 (2019.01)
G10L 15/22 (2006.01)

(52) U.S. Cl.
CPC .... G06F 16/24578 (2019.01); G06F 16/2455 (2019.01); G06F 16/24522 (2019.01); G06N 5/04 (2013.01); G10L 15/22 (2013.01)

(58) Field of Classification Search
CPC ........... G06F 16/24578; G06F 16/2455; G06F 16/24522; G06N 5/04; G10L 15/22
See application file for complete search history.

(56) References Cited

U.S. PATENT DOCUMENTS

| 7,693,705 | B1 | 4/2010 | Jamieson |
| 8,024,196 | B1 * | 9/2011 | Wodtke ............... H04M 3/4938 704/277 |
| 8,996,555 | B2 * | 3/2015 | Kuchmann-Beauger .................... G06F 16/242 707/763 |
| 9,070,366 | B1 | 6/2015 | Mathias |
| 9,690,776 | B2 | 6/2017 | Sarikaya et al. |
| 9,711,143 | B2 | 7/2017 | Kennewick et al. |
| 10,026,394 | B1 | 7/2018 | Carbon et al. |

(Continued)

FOREIGN PATENT DOCUMENTS

EP   2648137 A2   10/2013
WO   2006014824     2/2006

OTHER PUBLICATIONS

Kiseleva et al., "Understanding User Satisfaction with Intelligent Assistants", CHIIR '16: Proceedings of the 2016 ACM on Conference on Human Information Interaction and RetrievalMar. 2016, pp. 121-130 (Year: 2016).*

(Continued)

*Primary Examiner* — Mark D Featherstone
*Assistant Examiner* — Kweku William Halm
(74) *Attorney, Agent, or Firm* — Hamilton, Brook, Smith & Reynolds, P.C.

(57) ABSTRACT

In an embodiment, a method includes matching terms of a received query to a database of provider capabilities. The method further includes determining, for each portion of the received query, a respective provider to execute the portion of the received query. The method further includes sending each portion of the received query to its respective provider. The method further includes combining results from each respective provider to a returned query result.

20 Claims, 15 Drawing Sheets

(56) References Cited

U.S. PATENT DOCUMENTS

| | | | |
|---|---|---|---|
| 10,083,690 B2 | 9/2018 | Giuli et al. | |
| 10,631,057 B2 | 4/2020 | Yeh et al. | |
| 10,769,186 B2 | 9/2020 | Yeh et al. | |
| 10,847,175 B2 | 11/2020 | Yeh | |
| 2004/0184817 A1 | 7/2004 | Acero | |
| 2006/0031216 A1* | 2/2006 | Semple | G06F 16/71 |
| 2006/0053096 A1 | 3/2006 | Subramanian | |
| 2007/0124263 A1 | 5/2007 | Sanjeev | |
| 2007/0168335 A1* | 7/2007 | Moore | G06F 16/951 |
| 2008/0086363 A1 | 4/2008 | Kass et al. | |
| 2008/0235202 A1 | 9/2008 | Wang et al. | |
| 2009/0327343 A1 | 12/2009 | McCormarck | |
| 2011/0087629 A1 | 4/2011 | Reza | |
| 2011/0314375 A1* | 12/2011 | Zaika | G06F 3/0482 715/708 |
| 2012/0016678 A1* | 1/2012 | Gruber | B60K 35/00 704/275 |
| 2012/0059708 A1* | 3/2012 | Galas | G06Q 30/0251 705/14.43 |
| 2012/0102050 A1* | 4/2012 | Button | G06F 16/9535 707/749 |
| 2013/0132434 A1 | 5/2013 | Scofield | |
| 2013/0325164 A1 | 12/2013 | Gruber | |
| 2014/0025705 A1 | 1/2014 | Barve | |
| 2014/0164312 A1 | 6/2014 | Lynch et al. | |
| 2014/0244712 A1 | 8/2014 | Walters | |
| 2015/0161521 A1 | 6/2015 | Shah | |
| 2015/0261744 A1 | 9/2015 | Suenbuel | |
| 2015/0261745 A1 | 9/2015 | Song | |
| 2015/0379013 A1* | 12/2015 | Purcell | G06F 16/3329 707/708 |
| 2016/0041967 A1 | 2/2016 | Ghannam | |
| 2016/0173578 A1 | 6/2016 | Sharma et al. | |
| 2016/0180840 A1 | 6/2016 | Siddiq | |
| 2017/0024465 A1* | 1/2017 | Yeh | G10L 25/54 |
| 2017/0026705 A1 | 1/2017 | Yeh | |
| 2017/0186429 A1 | 6/2017 | Giuli | |
| 2017/0199928 A1* | 7/2017 | Zhao | G06F 16/24522 |
| 2018/0075847 A1 | 3/2018 | Lee et al. | |
| 2018/0137856 A1 | 5/2018 | Gilbert | |
| 2018/0276302 A1* | 9/2018 | Talyansky | G06F 16/9535 |
| 2018/0293484 A1 | 10/2018 | Wang et al. | |
| 2019/0034528 A1* | 1/2019 | Lintz | G06F 16/745 |
| 2019/0114359 A1 | 4/2019 | Yeh | |
| 2019/0318238 A1 | 10/2019 | Nokbak Nyembe et al. | |
| 2019/0348045 A1 | 11/2019 | Lee et al. | |

OTHER PUBLICATIONS

Yeh et al., "A Speech-Driven Second Screen Application for TV Program discovery" Jun. 10, 2014, Association for the Advancement of Artificial Intelligence.

Liu, J., et al., "A Conversational Movie Search System Based on Conditional Random Fields", MIT Computer Science & Artificial Intelligence Laboratory, Cambridge, MA, INTERSPEECH 2012.

Gruenstein, A., et al., "Releasing a Multimodal Dialogue System into the Wild: User Support Mechanisms", Proc. of the 8th SIGdial Workshop on Discourse and Dialogue, 2007.

Liu, J., et al., "A Dialogue System for Accessing Drug Reviews", MIT Computer Science and Artificial Intelligence Laboratory, Cambridge, MA, Automatic Speech Recognition and Understanding (ASRU), 2011 IEEE Workshop on IEEE, 2011.

Lafferty, J., "Conditioanl Random Fields: Probabilistic Models for Segmenting and Labeling Sequence Data", Proceedings of the 18th International Conference on Machine Learning, pp. 282-289, Jun. 2011.

Li, S., et al., "Understandign the Semantic Strucutre of Noun Phrase Queries", Microsoft Research, Proceedings of the 48th Annual Meeting of the Assocaition of Computational Linguistics, Associaition for Computational Linguistics, 2010.

Liu, J., et al., "Lexicon Modeling for Query Understanding", Acoustics, Speech and Signal Processing (ICASSP), 2011 IEEE International conference on IEEE, 2011.

Blei, D.M., "Latent Dirichlet Allocation", Journal of Machine Learning Research 3, 993-1022, 2003.

Glass, J., "A Probabilistic Framework for Segment-Based Speech Recognition", Computer Speech and Language, 17, 137-152, 2003.

Gruenstein, A., et al., "The WAMI toolkit for developing, deploying and evaluting web-accessible multimodal interfaces", Proceedings of the 10th International Conference on Multimodal Interfaces, ACM, 2008.

McCraw, I., et al., "Automating Crowd-superised Learnging for Spoken Language Systems", INTERSPEECH 2012.

Bobrow, D., et al., "A basic logic for textual inerface", Proceedings of the AAAI Workshop on Inerface for Textual Question Answering 2005.

Borthwick, A., et al.., "Exploiting diverse knowledge sources via maximum entropy in named entity recognition", Proc. of the 6th Workshop on Very Lage Corpora, Vo. 182, 1998.

Crouch, D, et al., "Semantics via f-structure rewriting", Proceedings of the LFG06 Conference 2006.

Gatt, A., et al., "SimpleNLG: A realisation engine for practical applications", Proceedings fo the 12th European Workshop on Natural Language Generation, Association for Computational Linguistics, 2009.

Kate, R., et al., "Learning to Transform Natural to Formal Languages", Proceedings of the National Conference on Artificial Intelligence, 20:3, Menlo Park, CA; Cambridge, MA, London; AAAI Press, MIT Press, 1999, 2005.

Maxwell, J., et al., "The interface between phrasal and functional constraints", Computational Linguistics, 19:4, 571-590 (1993).

Miller, G.A., "WordNet: a lexical database for English", Communications of the ACM 38:11, 39-41 (1995).

Popescu, A., et al. "Towards a theory of natural langauge interfaces to databases", Proceedings of the 8th Internatiaols Conference on Intelligent User Interfaces, ACM, 2003.

Ratnaparkhi, A., "A maximum entropy model for part of speech tagging" Proceedings of the Conference on Empiracal Methods in Natural Language Porcessing,vol. 1, 1996.

Zelle, J., et al. "Learning to Parse Database Queries using Inductive Logic Programming", Proceedings of the National Conference on Artificial Intelligence 1996.

International Search Report for PCT/US2018/055860 dated Feb. 4, 2019, entitled "System and Method for Contextual Reasoning".

Fujino, T., et al., "A SPARQL Query Rewriting Approach on Heterogeneous Ontologies with Mapping Reliability", 2012 IIAI International Conference on Advanced Applied Informatics, pp. 230-235, Sep. 1, 2012.

Rivero, C.R., et al., "A Reference Architecture for Building Semantic-Web Mediators", In: "Serious Games", Jan. 1, 2011.

Jain, P., et al., Nuance Reasoning Framework: A Rule-Based System for Semantic Query Rewriting: Second International Joint Conference, Luxembourg, In: "Serious Games", vol. 11092, pp. 285-292, Jan. 1, 2018.

Yeh, et al., "A Speech-Driven Second Screen Application for TV Program Discovery" Association for the Advancement of Artificial Intelligence Jun. 10, 2014.

* cited by examiner

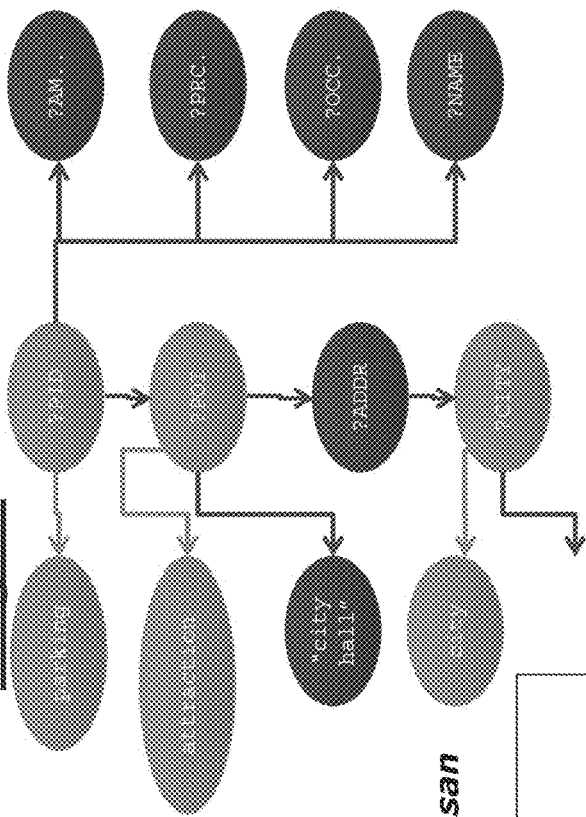

SYSTEM AND METHOD FOR INTELLIGENT KNOWLEDGE ACCESS

RELATED APPLICATION

This application is related to "System and Method for Contextual Reasoning" by Peter Yeh, Ezra Story, and Prateek Jain, filed on Oct. 16, 2017, having Ser. No. 15/785,347 and assigned to a common assignee as the present application. The entire teachings of the above application are incorporated herein by reference.

BACKGROUND

Natural language understanding (NLU) systems receive user speech and translate the speech directly into a query. Often, NLU systems are configured to operate on smartphones. These NLU systems can also direct such a query to a search engine on the smartphone or accessible via a wireless network connection to perform Internet searches based on the content of the query.

SUMMARY

In an embodiment, a method includes matching portions of a received query to a database of provider capabilities. The method further includes determining, for each portion of the received query, a respective provider to execute the portion of the received query based on the provider capabilities. The method further includes sending each portion of the received query to its respective provider. The method further includes combining results from each respective provider to form a returned query result.

In an embodiment, combining the results further includes, based on the results from each provider, filtering a list of results by applying hard constraints from portions of the received query, and ranking a list of results based on a priority of soft constraints from portions of the received query.

In an embodiment, the method includes determining whether a first respective provider requires receiving results from a second provider, and, if so, sending appropriate results of the second provider to the first provider as input.

In an embodiment, the respective providers include at least one of the following: a third party content provider application programming interface (API), internal database, and a virtual assistant.

In an embodiment, the method further includes providing a semantic description corresponding to each respective provider. Determining a respective provider to execute the portion of the received query includes determining whether the portion of the received query includes a request for a resource described by the semantic description corresponding to the respective provider.

In an embodiment, the method further includes constructing a plan that includes an order of invoking each respective provider.

In an embodiment, combining results from each respective provider to return a query result further includes determining a first result from a first provider, and sending the first result to a second provider as part of the portion of the query to the second provider. In this embodiment, the first result from the first provider is employed to resolve the portion of the query to the second provider.

In an embodiment, the method includes relaxing a portion of the query if a combination of fields or values of the query produce an incompatible result.

In an embodiment, the method includes comparing variables and connections between variables of a received query to variables and connections between variables to at least one stitching template to find a best matching stitching template. The method further includes finding a connection present in the best matching stitching template from a first template variable to a second template variable that is absent in the portion of the received query between a first query variable and a second query variable. The first query variable and second query variable correspond to the first template variable and second template variable. The method further includes copying at least one connection from the stitching template to the portion of the query between the first query variable and second query variable.

In an embodiment, a system includes a processor, and a memory with computer code instructions stored therein. The memory is operatively coupled to said processor such that the computer code instructions configure the processor to implement a planning module configured to match portions of a received query to a database of provider capabilities, and determine, for each portion of the received query, a respective provider to execute the portion of the received query based on the provider capabilities. The processor is further configured to implement a query execution module configured to send each portion of the received query to its respective provider, and combine results from each respective provider to form a returned query result.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 7A is a diagram illustrating an example embodiment of a query representing a voice request.

FIG. 7B is a diagram illustrating an example embodiment of identifying candidate plugins based on the query illustrated in FIG. 7A.

DETAILED DESCRIPTION

A description of example embodiments follows.

When a user requests information from a virtual system, two problems can arise. First, the user may assume that the system is aware of, or can process, implicit or contextual information. The user's assumption is based on a human's ability to perform reasoning based on contextual information. Contextual information can include environment or personal preferences. Current systems, however, are not aware of and do not consider many pieces of contextual, or implicit, information. Examples of contextual information can include, in a vehicle context, accessibility needs for a parking request, or weather based information for covered parking, or parking closer to a requested destination venue. Such contextual information can be provided by a user settings file, or systems or sensors of a car, such as systems indicating a windshield wiper is running or headlights are activated, and the like.

Figure 1:
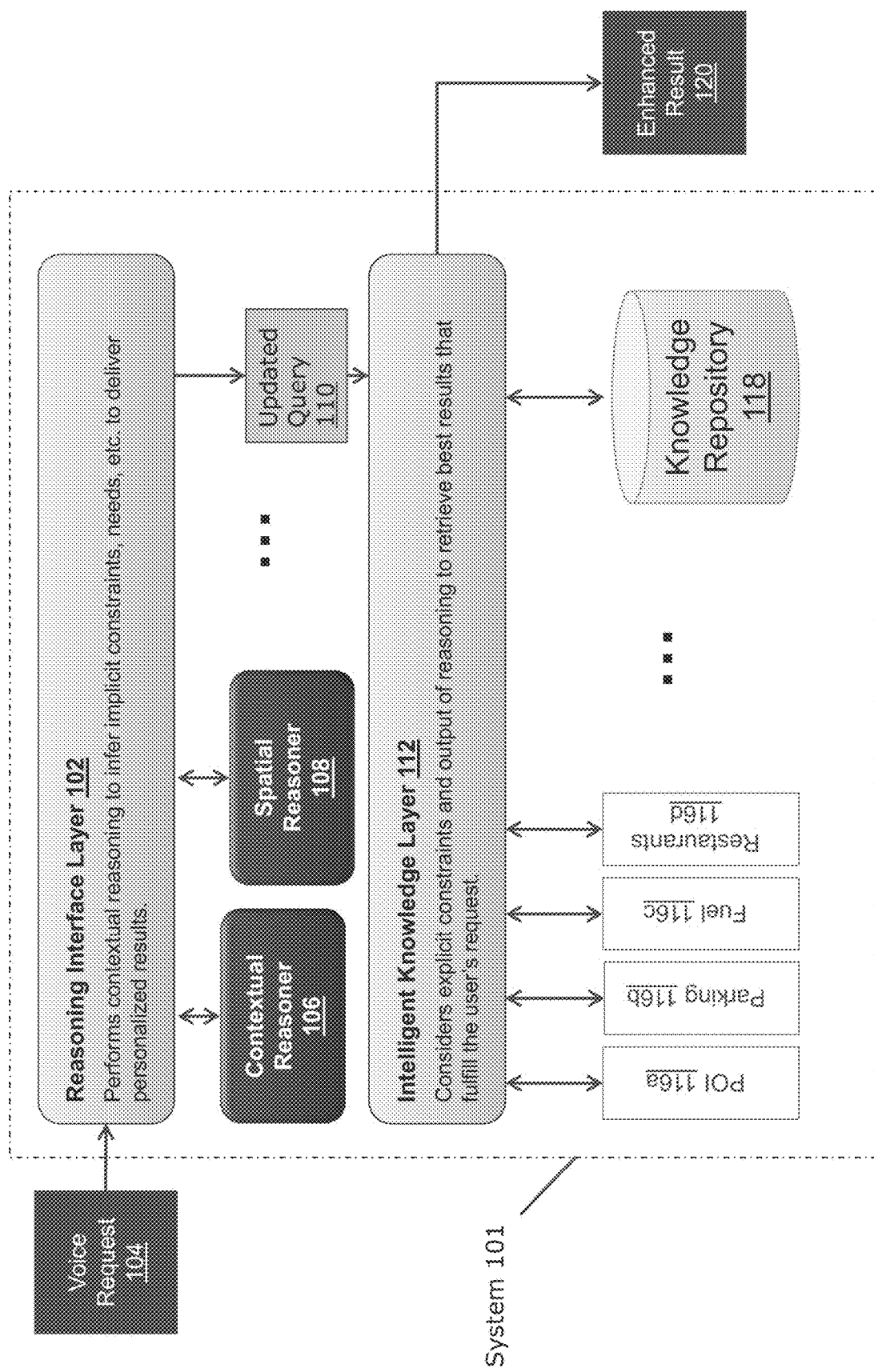
FIG. 1 is a block diagram illustrating an example embodiment of the present invention.

FIG. 1 is a block diagram 100 illustrating an example embodiment of the present invention. With reference to FIG. 1, a system 101 receives a voice request 104 for processing. A person of ordinary skill in the art can recognize that the voice request 104, in other embodiments, can be a text-based request, or a formatted query, but for purposes of simplicity, the description of various example embodiments herein refers to any such user request as a voice request. A person of ordinary skill in the art can understand that the voice request 104 can be processed by an automated speech recognition (ASR) or natural language understanding (NLU) system.

A reasoning interface layer 102 receives the voice request 104. The reasoning interface layer is configured to perform contextual reasoning to infer implicit constraints, needs, etc. to deliver personalized results to the user issuing the voice request 104. The reasoning interface layer interfaces with multiple reasoning modules, such as a contextual reasoning module 106 and a spatial reasoning module 108 to produce an updated query 110. The reasoning interface layer 102 is described in further detail in reference to FIGS. 2-4 below.

Once such contextual information is determined, the virtual system has to process the information and fulfill that request. The virtual system has to determine which resource to access for a query with multiple parts. The system can have access to competing providers (e.g., sources of information or content) from which to select, or multiple providers that provide outputs that need to be combined together to create the final answer.

An intelligent knowledge layer 112 receives the updated query 110. A person of ordinary skill in the art can recognize that the intelligent knowledge layer 112 can also operate on a query received directly from the user, or from another source other than the reasoning interface layer 102. However, the reasoning interface layer 102 and intelligent knowledge layer 112 working in combination provide a greater benefit by updating the query and enhancing the result in the intelligent knowledge layer 112.

The intelligent knowledge layer 112 considers explicit constraints (or hard constraints) in the received query (e.g., updated query 110) to retrieve best results that fulfill the user's request. The intelligent knowledge layer 112 is configured to analyze the updated query 110, determine a strategy for resolving the query using third party sources such as a point of interest (POI) database 116a, parking database 116b, fuel range resource 116c, and restaurants 116d. The intelligent knowledge layer further interfaces with a knowledge repository 118. The intelligent knowledge layer 112 provides an enhanced result 120 to the user. The intelligent knowledge layer 112 is described in further detail in relation to FIGS. 5-8 below.

Solving these problems can be applied to multiple application areas. For example, a voice response system in a vehicle can provide directions to the most appropriate parking garage given a user's preferences and sensed information from the vehicle. For example, finding covered parking in rain/snow conditions is preferred over uncovered parking.

Another application is with devices using the Internet of Things (TOT) framework. A centralized hub can serve as the gateway between the user and the outside world, where the outside world are services/virtual systems that are accessed through the same hub. For example, a user might request to order a pizza for a Boston Red Sox game. The centralized hub can process the request to determine the time of the Boston Red Sox game, and automatically generate the pizza order to arrive at that time. However, this requires the system to determine when the Red Sox game is, what type of pizza the user likes, where the best restaurant to order from is, whether that restaurant delivers to the user's current address, and how long the restaurant will take to order. After determining this information, it can generate the request to the best restaurant for delivery to the user.

Applicant's system and method provides advantages by adding contextual reasoning non-query expressed data to an expressed query. While current systems may consider geolocation in contextual reasoning, Applicant's system adds in additional contextual information by using specialized logical reasoners.

Further, current systems, such as Apple's Siri®, can be configured to perform a hard wired search to go to a particular provider (e.g., Yelp for restaurants) no matter the query parameters. Each virtual assistant has a dedicated source to use for each type of query. However, depending on the request, it can make more sense to go to a different source particular to the request. Applicant's system employs dynamic selection of sources. Each source is correlated with a declaration of its abilities, and can therefore be matched up better with particular queries. Each declaration states what each source knows about and what each source can provide. Further, each source can be associated with dimensions that it knows about, weights, or confidence scores, of how useful each dimension is, and confidence scores corresponding to each query. For example, when there are two competing sources for a restaurant query, both sources may have information about restaurants and their opening/closing hours, but only one knows more about amenities (e.g., Wi-Fi, handicapped accessible restrooms, type of lighting, bar seating, etc.) at the restaurant. A description for sources captures the known amenities with a high confidence score. Therefore, when user generates a query about a restaurant with particular amenities, that query can be directed to that source. Another source might have a high confidence score for an availability dimension. Therefore, when a user asks about whether a table is available at a particular time, it is directed to that source. Applicant's system and method therefore has a matching and planning process that compares the information needed to resolve a query against capability descriptions of each available source. Further, a query may include information that is across multiple categories. An example of such a query is "find me a good restaurant near the marina, and directions to parking there." The system needs to first find the location of the marina, then good restaurants (e.g., above a certain rating) near that location, and then parking near the restaurant. This pulls from a database correlating businesses to locations/addresses, another database correlating restaurants that are near a location, and then a third parking database.

In other words, when asking to park near a destination, the system resolves the first point of interest (POI) before you performing the next search of parking. Other systems may send the unresolved POI to the content source directly, however, sending "restaurant near the marina" to a parking database may be unsuccessful without pre-processing. When the user says "find parking at a good Italian restaurant by the marina," the system needs to resolve the POI "good Italian restaurant by the marina" before sending that to the parking service, because the parking service may not answer the query correctly without a resolved POI.

The system and method further needs to have a mechanism to perform relaxation to an over-constrained constraint of a query. In other systems, an overly-constrained query can default to an Internet web search of the query, or drop recognized constraints arbitrarily until a result is found. However, each of the constraints can have an importance to the user. That importance can be derived and quantified from the user's preferences or by other contextual cues that the system can infer and assert. For example, the query "find a cheap parking handicapped parking place" may need to determine which is more important—cheap parking, or accessible parking. The system and method can determine the subset of constraints that can be satisfied that brings the most satisfaction to the user. This can be judged by a user-by-user basis. For example, a user that cannot use non-accessible parking under any circumstances is likely to pay whatever is necessary for an accessible parking spot, despite requesting cheap parking. Therefore, the system prioritizes, in this case, accessible parking over cheap parking, instead of arbitrarily choosing between the two.

Figure 2:
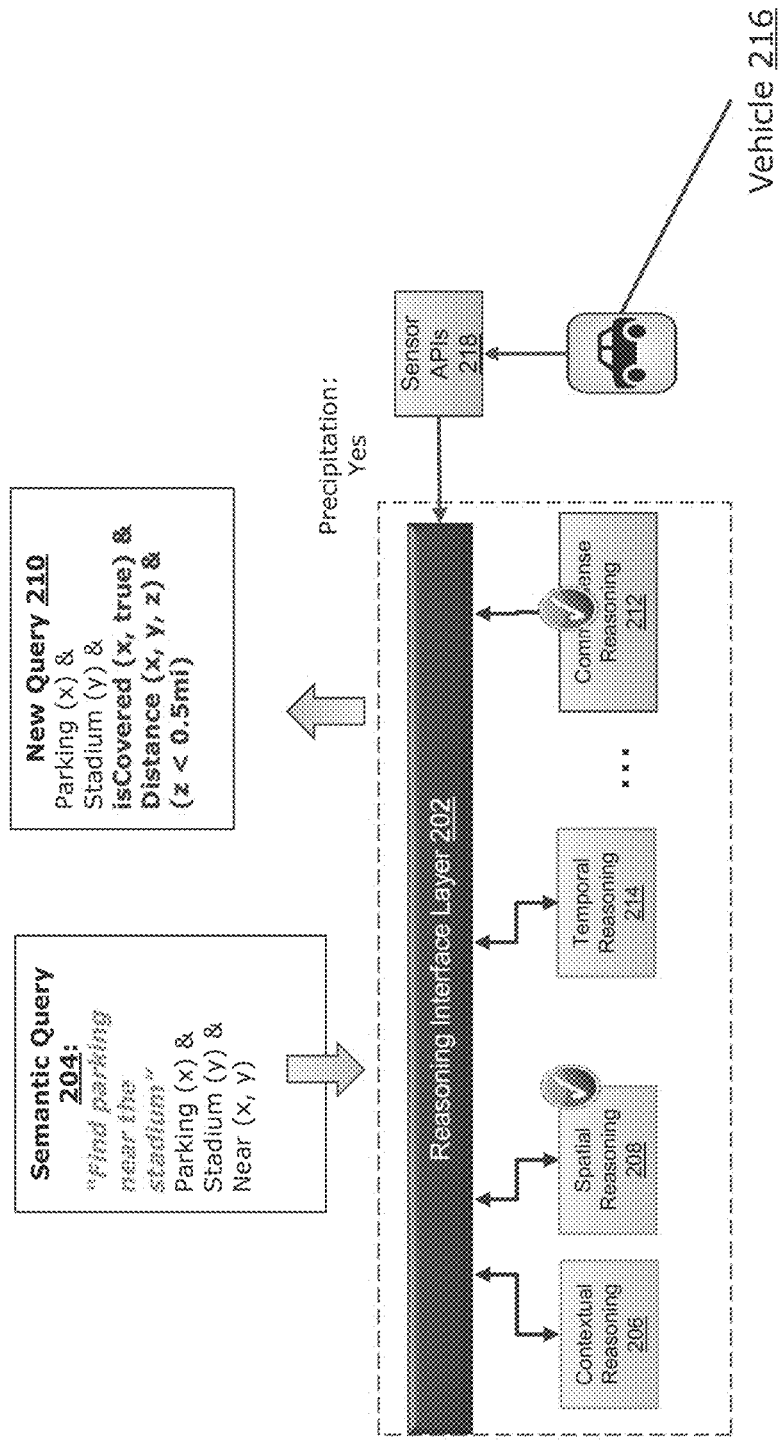
FIG. 2 is a block diagram illustrating an example embodiment of a reasoning interface layer.

FIG. 2 is a block diagram illustrating an example embodiment of a reasoning interface layer 202. The reasoning interface layer 202 can be a further embodiment of the reasoning interface layer 102 of FIG. 1. With reference to FIG. 2, the reasoning interface layer 202 receives a semantic query 204. The semantic query 204, in this one example, is based on the voice request "find parking near the stadium." The semantic query can be logically represented as "Parking (x) & Stadium (Y) & Near (X,Y)," where (X) represents the parking location and (Y) represents the stadium location, and "Near(x,y)" resolves a location near (X) and (Y). The reasoning interface layer communicates with a reasoning layer, which can include multiple reasoning modules. In the example of FIG. 2, the reasoning layer includes a contextual reasoning module 206, a spatial reasoning module 208, a temporal reasoning module 214, and a commonsense reasoning module 212. The reasoning interface layer 202 can also receive additional information from sensor application programming interfaces (APIs) 218 of a vehicle 216 or other system. As such, the reasoning interface layer 202 is a flexible framework that allows for a wide range of reasoning techniques to be integrated and accessed via a unified interface. The reasoning interface layer 202 interfaces with a reasoner arbitration which automatically determines which reasoners to employ. Further, the reasoning interface layer 202 can interface with a consistency checker that merges inferences from multiple reasoners into one consistent solution before providing the new query 210.

In this example, the reasoning interface layer 202 employs the spatial reasoning module 208 and common-sense reasoning module 212. The reasoning engines support frequently occurring reasoning requirements such as spatial reasoning 208, contextual reasoning 206, temporal reasoning 214, and common sense reasoning 212. In this example, to find parking near the stadium, the reasoning interface layer interfaces with the sensor APIs 218 of the vehicle 216 to determine that there is precipitation. From that, the contextual reasoning module 206 determines the new query 210 should include a request for covered parking, and therefore adds "isCovered (x, true)" to the query, indicating that the parking should be covered. Further, the common sense reasoning module 212 determines that distance from the parking to the stadium should be less than a half of a mile, and adds in the Distance (x,y,z) & z<0.5 miles to the new query 210. Therefore, the new query 210 is enhanced to better serve the user, without the user having to explicitly request these additional query elements.

Figure 3:
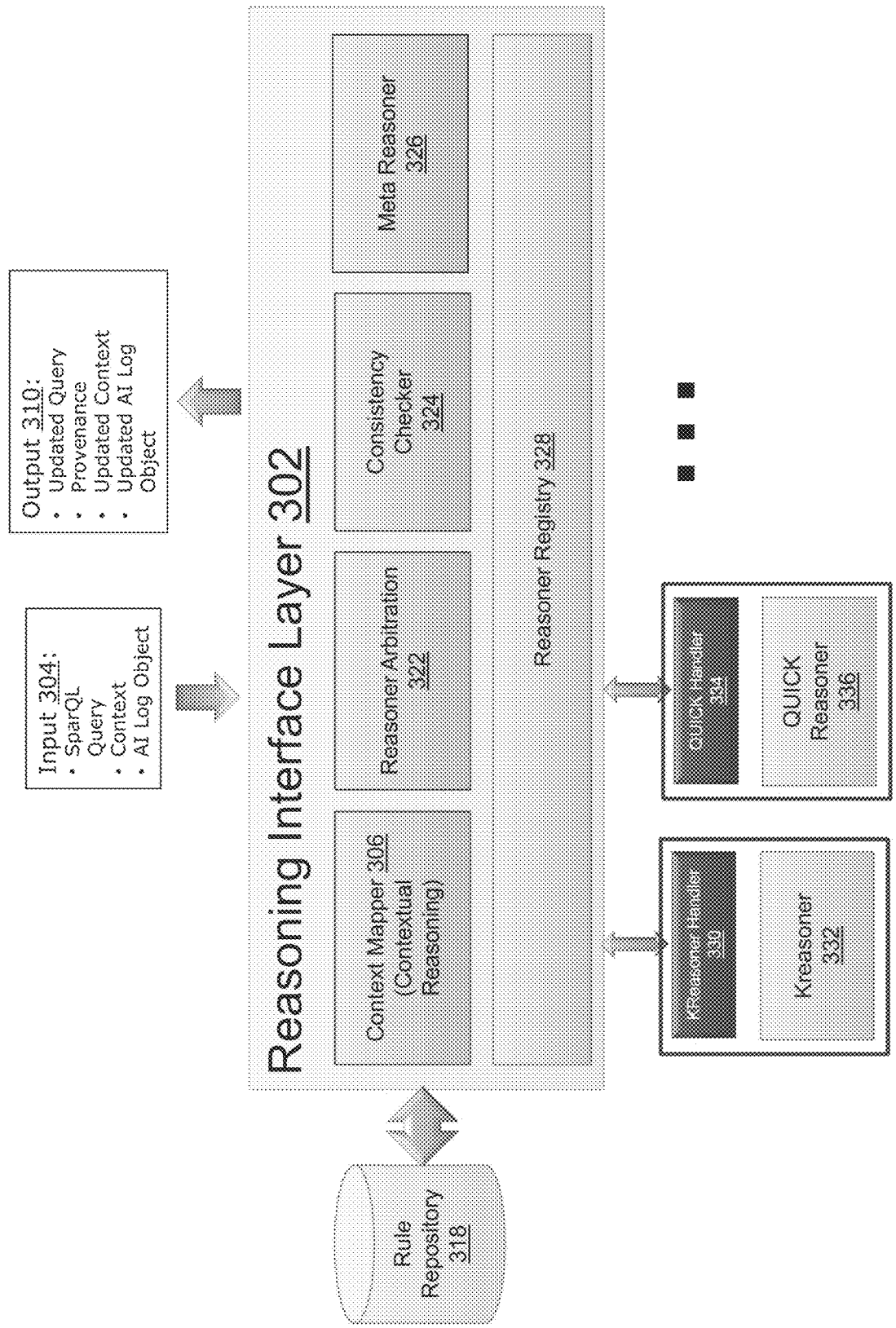
FIG. 3 is a block diagram illustrating another embodiment of the reasoning interface layer.

FIG. 3 is a block diagram 300 illustrating another embodiment of the reasoning interface layer 302. The reasoning interface layer 302 receives inputs 304 including a query (e.g., a SparQL query), contextual information, and an Artificial Intelligence (AI) Log Object. Then, the reasoning interface layer 302 provides an output 310 of an update query, a provenance, an updated context, and an updated AI Log Object. The reasoning interface layer 302 interfaces with a context mapper 306, reasoner arbitration 322, consistency checker 324, and a meta reasoner 326. The reasoning interface layer 302 further interfaces with a rule repository 318 as well.

The context mapper 306 converts incoming contextual information from JavaScript Object Notation (JSON) to an internal representation that is utilized by the different reasoners. The context mapper 306 validates the JSON, and if the input JSON is valid, the context mapper, using an open source library, parses the JSON to identify the different keys and their corresponding values. After identifying the keys and values, context mapper 306 converts the keys and values to the internal representation.

The reasoner arbitration/arbitrator 322 identifies the reasoners that are relevant for the given query and contextual information. A number of arbitration strategies are provided with a reasoning framework and additional arbitration strategies can be added by implementing a Java, or other language's, interface. Some of the arbitration strategies which are available as part of the reasoning framework are Broadcast, Naïve Bayes, and TF-IDF. However, the reasoning framework can further plug-in any arbitration strategy. The plug-and-play of different arbitration strategies is a novel aspect of Applicant's present disclosure, and allows for different systems to easily change their method of arbitration among different reasoners.

A Broadcast arbitration strategy sends the query and contextual information to all the reasoners plugged into the system.

A Naïve Bayes arbitration strategy converts the reasoner selection problem into a classification problem and by utilizing a Naïve Bayes classifier for identifying the relevant reasoners. The Naïve Bayes classifier is a supervised training method which receives, as input, a set of features and associated class labels. The definition of a feature depends on the problem and how a user wants to model them. For example, in a problem where the objective is to identify spam emails, the presence/absence of a word can serve as feature.

Below is an example embodiment of a rule in XML format that would be stored in the rule repository 318. However, a person of ordinary skill in the art can understand that the rule can be in other formats, including formats other than XML.

```
<rule>
    <id> DDISCv4_BIZ_NEED_RESTROOM </id>
    <gloss>
        Prioritize coffee shops and fast food restaurants if driver needs
        to use restroom.
    </gloss>
    <reasoner>Business_Reasoner</reasoner>
    <priority> 4.0 </priority>
    <active> true </active>
    <definition>
        ?PoB rdf:type         nuan:business.generic .
        ?PoB nuan:fulfills_need ?NEED .
        FILTER (?NEED = nuan:amenity.toilet)
        ->
        Assert:
            ?PoB nuan:category ?CATEGORY .
            FILTER SOFT 70
                (?CATEGORY = nuan:business.coffee_shop ||
                 ?CATEGORY = nuan:business.fast_food)
    </definition>
</rule>
```

With rules such as above, feature construction can be performed as follows: First, the reasoning framework constructs a vocabulary V, which is a set of terms utilized in the rule definition. Then, the reasoning framework constructs a vector for the rules iteratively, marking each term present in V as 0 if the term is absent from the rule. If the term is present in the rule, the term frequency is utilized instead of 0. The reasoner to which the rule is assigned to serves as the class label.

For example, in case of the rule above, the terms of the rule definition are:

```
?PoB rdf:type         nuan:business.generic .
?PoB nuan:fulfills_need ?NEED .
FILTER (?NEED = nuan:amenity.toilet)
->
Assert:
    ?PoB nuan:category ?CATEGORY .
    FILTER SOFT 70
        (?CATEGORY = nuan:business.coffee_shop ||
         ?CATEGORY = nuan:business.fast_food)
```

The reasoning framework parses the rule to identify the rule head, which is denoted by the part to the left of/prior to "→" in the rule definition. The rule head is then tokenized which results in a list, such as [?POB, rdf:type, nuan:business.generic, . . . ].

In the feature vector, the reasoning framework calculates the frequency for each of the terms present in the list. The terms which are present in V, but are not present in the list are marked "1" to account for Laplace Smoothing. The reasoners that the rule belongs to (as specified in the reasoner field—Business_Reasoner) serve as the label for this feature vector.

To summarize, at the end of the process, there are as many feature vectors as there are rules. Each vector has associated labels, which are the name of the reasoners it is associated with/belongs to.

The method train the Naïve Bayes method using the feature vectors calculated, as described above. The output is a trained model, which can be utilized on unlabeled data in the next step.

As described above, the reasoning framework receives a query, which can be a SPARQL query, and contextual information as input. As described herein, the reasoning framework can receive any type of query, but the disclosure herein may refer to SPARQL queries. A person of ordinary skill in the art can recognize that such SPARQL queries can be queries formatted in other ways, including queries represented as first-order logic, etc. The reasoning framework combines the two and converts them into a feature vector using the above described process. The generated vector V' does not have a label or is the unlabeled data. However, the model described above can generate, as output, labels and their associated probability. The label names generated by the model are the names of the reasoners which are best equipped to process the query and the given contextual information.

The reasoning framework can employ one of the two strategies to pick the right reasoner. First, the reasoning framework can utilize the top k reasoners by score. Second, a cut off score can be provided to the reasoning framework, and reasoners above the threshold can be utilized for the purposes of a processing a query.

Term Frequency-Inverse Document Frequency (TF-IDF) is a technique utilized to identify how important a given word is to a document. The TF component indicates how many times a word appears in a given document. The IDF component normalizes the TF component, by calculating the reciprocal of the number of documents in the collection containing the term. For reasoning framework arbitration, TF-IDF arbitration is utilized as follows.

First, the collection of rules is parsed to remove stop words and identify the term frequency for each rule term (a) in a given rule (b) in the entire rule base. The reasoning framework populates three data structures H1 and H2 to store (a) and (b). H1 is a list of all the rules and a mapping of terms in the rule to their frequencies. H2 consists of all the terms and their frequency. In addition, a dictionary that maps the rule ID to the list of reasoners it belongs to is stored in a data structure D.

For a new query and contextual information, the method identifies non-stop words, and retains and stores them in a list L. To calculate TF-IDF for each term t in L, there are two components—(i) t's frequency in every rule and (ii) t's frequency across the rule base. For each term stored in list L, term frequency—tf in a given rule is calculated by using the structure H1. Term frequency across the rule base—idf is calculated using the structure H2. TF-IDF score (tf-idf) is then calculated using the two components tf and idf.

Then, the sum of the (tf-idf) for all input query and context terms is utilized to calculate the final tf-idf score for the given query and rule. After the TF-IDF score is calculated using the structure D, the final selection of reasoners can be made in one of the two ways: (1) find the top k rules ranked by score, or (2) identify rules above a specific cut off. Both strategies can be configured in the reasoning framework configuration file.

The consistency checker 324 employs reasoner mediation to merge the responses returned by the different reasoners. Each reasoner in the reasoning framework has an associated priority with it and this priority is utilized in strategies employed by with the reasoning framework. A first strategy is a greedy Strategy, which uses the result from the reasoner with highest priority, while other reasoners are ignored. A second strategy is a smart merge strategy, which uses the result from the reasoner with the highest priority is utilized as a starting point for the query to be returned. In other words, the smart merge strategy chooses from a descending order of the priority of reasoners to merge non conflicting components of the result from the other reasoners into the query to be returned. Conflicting components of the results are discarded.

Figure 4:
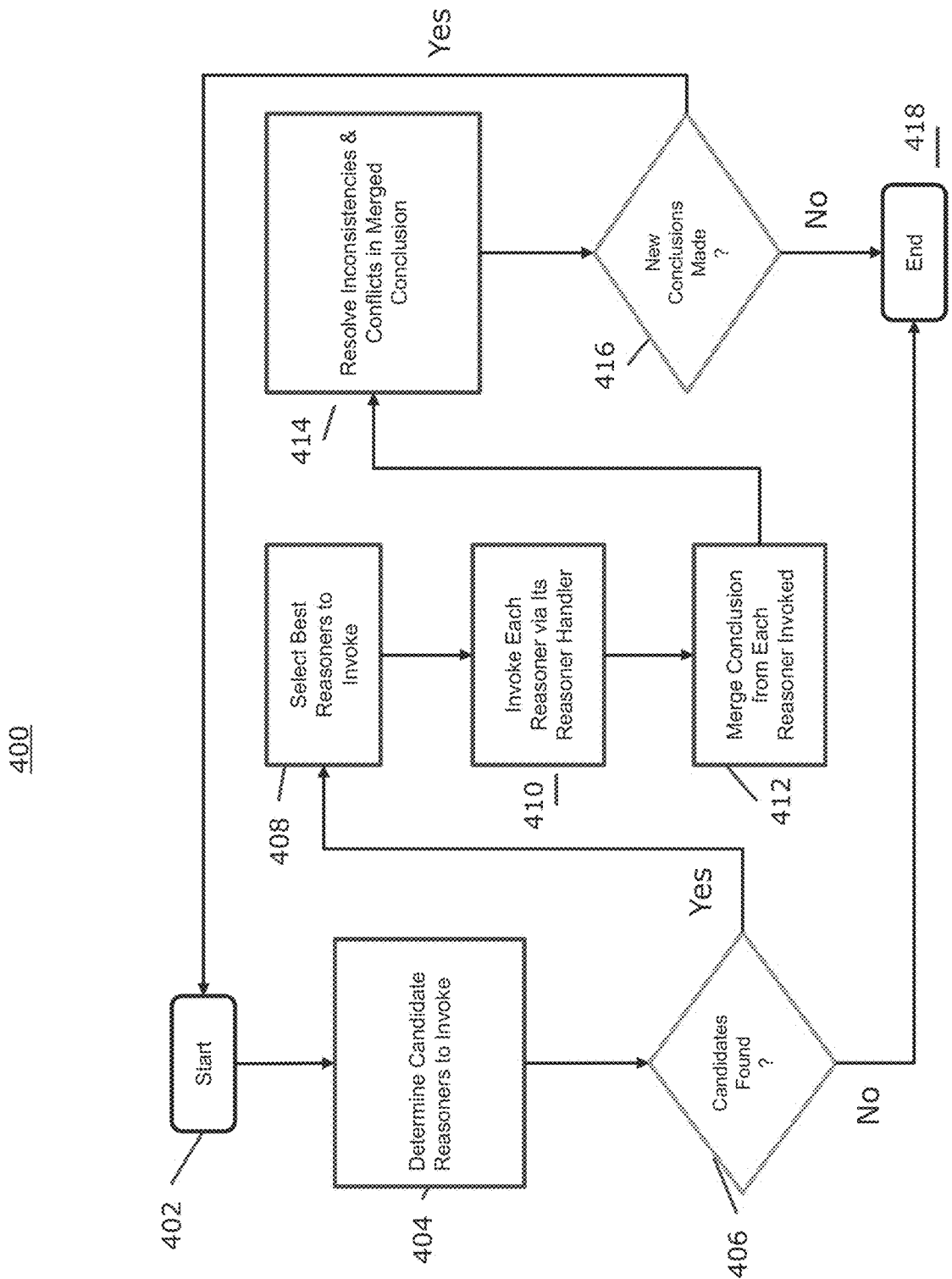
FIG. 4 is a flow diagram illustrating an example embodiment of a method employed by the present invention.

FIG. 4 is a flow diagram 400 illustrating an example embodiment of a method employed by the present invention. The method begins (402) and determines candidate reasoners to invoke, which can be based on the arbitration strategies disclosed above, including Broadcast, Naïve Bayes, and TF-IDF (404). As described above, multiple candidate reasoners provide flexibility to query enhancement. Additional reasoners can be added with minimal change to the overall structure of the reasoning interface layer. Further, each reasoner can add new types of modular reasoning to the reasoning interface layer, where a single reasoner would have to be re-coded. If no candidate reasoners are found (406), the method ends (418).

However, upon finding candidate reasoners (406), the method selects the best reasoners to invoke (408) and invokes the reasoner via its reasoner handler/API (410). Then, the method merges conclusions from each invoked reasoner (412) and resolves inconsistencies and conflicts in the merged conclusion (414). This resolution can be based on a predefined strategy such as giving preference to a reasoner with higher confidence. Then, the method determines whether new conclusions were made (416). If so (416), the method begins another iteration. If not, (416), the method ends (418).

Figure 5:
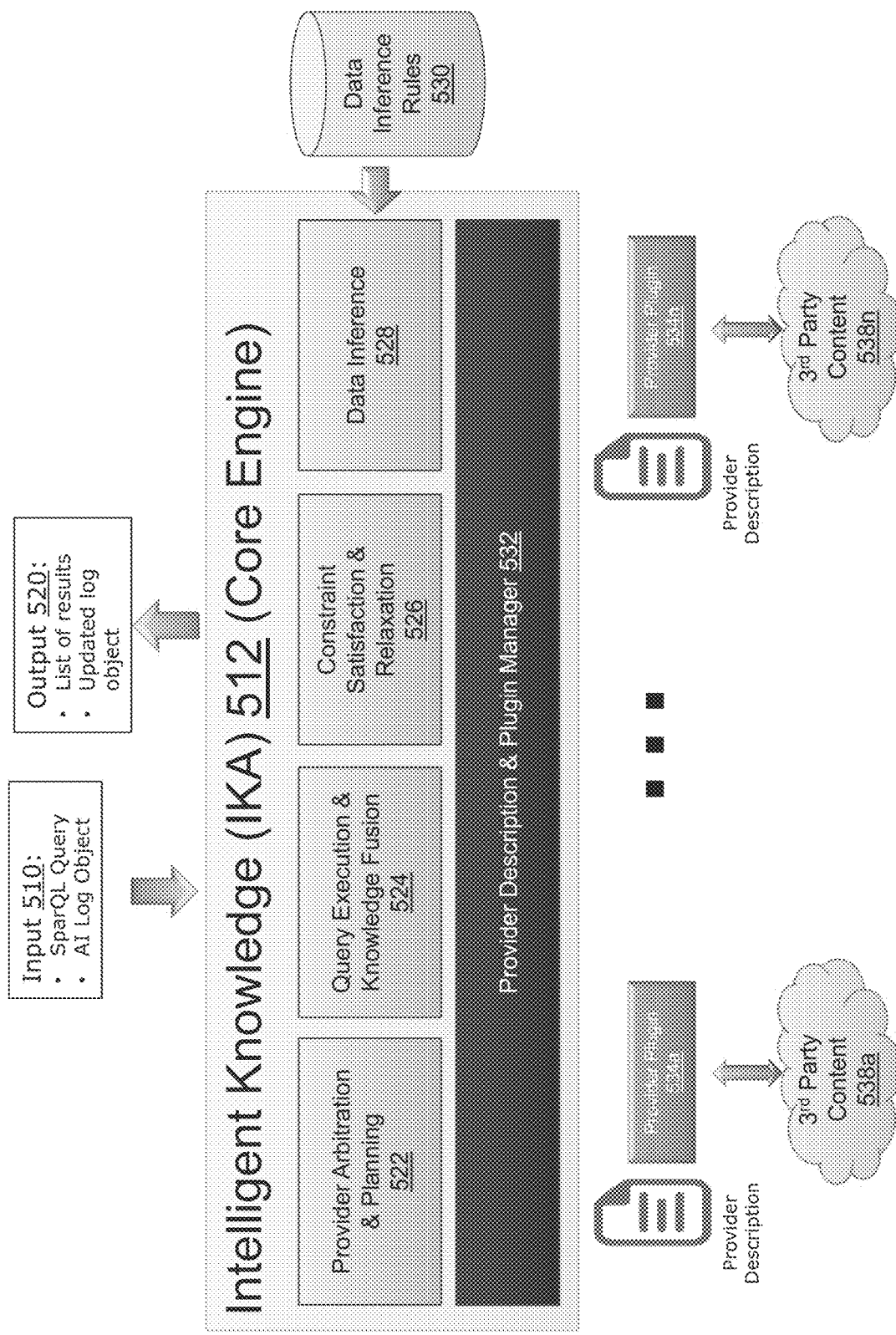
FIG. 5 is a diagram illustrating an example embodiment of an intelligent knowledge layer/core engine.

FIG. 5 is a diagram 500 illustrating an example embodiment of an Intelligent Knowledge 512 intelligent knowledge layer/core engine. The intelligent knowledge layer 512 receives an input 510 including a SparQL Query (e.g., from the reasoning interface layer 102 of FIG. 1) and provides an output 520 including a list of results and an updated log object. A person of ordinary skill in the art can recognize that other formats other than the SparQL Query can be used. However, for the purposes of simplicity, SparQL Query/Queries are referenced herein, but can be any other format of query. The intelligent knowledge layer 512 fulfills user requests through semantic routing capabilities and processing of complex to produce high-quality, on-target results. The intelligent knowledge layer 512 provides many features. First, the intelligent knowledge layer 512 allows for provider arbitration by analyzing each request and determining which provider to invoke to resolve each query. The intelligent knowledge layer 512 further provides knowledge fusion that dynamically chains providers when appropriate and merges their results. A constraint satisfaction and relaxation module of the intelligent knowledge layer 512 further applies implicit and explicit constraints, including logical operators, to perform constraint satisfaction, but further can relax and prioritize constraints as needed to provide constraint relaxation. For example, hard constraints can be applied to high priority portions of the received queries. The hard constraints require that the high priority portions of the received queries are resolved first, followed by lower priority portions of the received query. The constraint satisfaction and relaxation module can further relax constraints by determining portions of the queries that can be ignored in order to return a result. Constraints are relaxed when a result is not possible that satisfies all portion of the query. A data inference module 528 of the intelligent knowledge layer 512 can further infer missing values and attributes based on declarative inference rules. The intelligent knowledge layer 512 can also integrate new content providers using a configurable, declarative framework, using a provider description & plugin manager 532, which includes instructions for interfacing with each provider plugin 534a-n, and also a description of what type of data each provider plugin 534a-n can receive and output.

A provider arbitration and planning module 522 of the intelligent knowledge layer 512 can analyze the SparQL Query of the input 510 and can determine which providers 534a-n are needed to resolve each part of the query. The provider arbitration and planning module 522 can determine chaining of providers as well. For example, resolving the query "find me handicapped accessible parking by the marina" can require using multiple providers, and chaining the results from each. A first provider can provide a geolocation for the marina, and a second provider can provide a list of handicapped accessible parking facilities near that geolocation. Another example query can be "find me parking near a highly-rated Italian restaurant near the stadium." Again, a first provider returns a geolocation of a stadium. Then, a second provider returns a four- or five-star Italian restaurant near that geolocation. Then, a third provider searches for parking near the geolocation of the Italian restaurant. By analyzing the query ahead of time using the provider arbitration and planning module 522, these chained requests can be executed accurately.

The query execution and knowledge fusion module 524 is responsible for executing the plan provided by the provider arbitration and planning module 522 by interfacing with the provider plugins 534a-534n and retrieve the relevant third party content 538a-n. As chained requests are completed, the query execution & knowledge fusion module 524 fuses the information together to determine the result.

Figure 6:
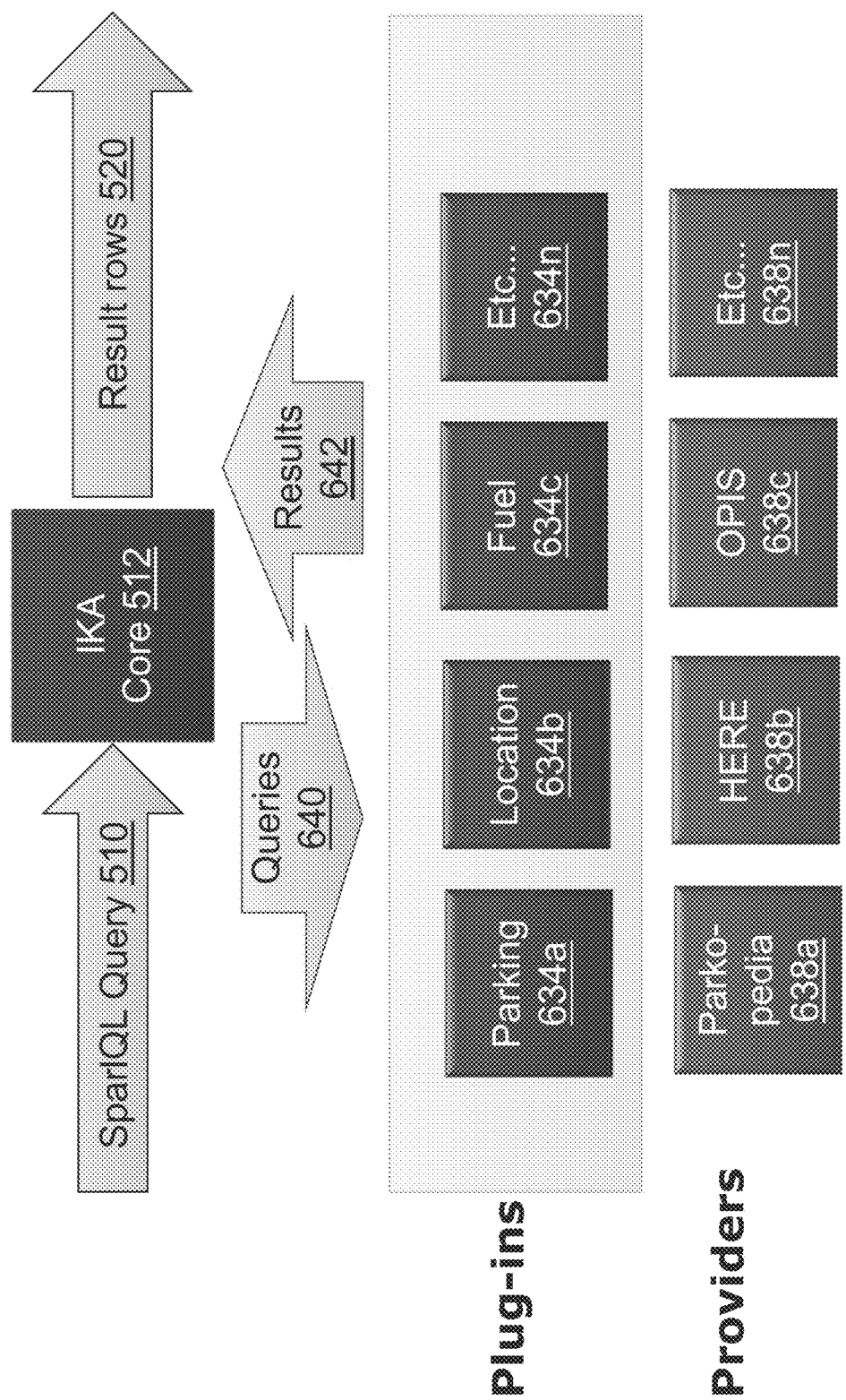
FIG. 6 is a diagram illustrating an example embodiment of the intelligent knowledge layer.

FIG. 6 is a diagram 600 illustrating an example embodiment of the intelligent knowledge layer/core 512. The intelligent knowledge layer 512 receives a SparQL Query 510 and outputs result rows 520, as described in relation to FIG. 5. In relation to FIG. 6, responsive to receiving SparQL Query 510, the intelligent knowledge layer/core 512 generates Queries 640 to be sent to plugins 634a-n. Each plugin then access one or more providers 638a-n to retrieve results 642 to return to the intelligent knowledge layer/core 512. For example, the parking plugin 634a can access Parkopedia 638a, but may arbitrate between several parking providers 638a, depending on the requested information in the queries 640 and the available information advertised by each parking provider 638a. For example, one parking provider may provide information regarding handicapped accessibility, while another provides information regarding amenities at the parking location. Therefore, depending on the query, the parking plugin 634a may be able to better utilize one provider 638a over another provider 638a. Therefore, a query requesting handicapped accessibility should be directed to the parking provider with information about handicapped accessibility. A query requesting amenities at the parking location should be directed to the provider regarding amenities at the parking location. However, a query that requests both information about handicapped accessibility and amenities at the parking location should be arbitrated to determine which information is more important to the user, and direct the query appropriately. In this case, it is likely that handicapped accessibility has a weighting of high importance to the user, and therefore the query is directed to the provider with information about handicapped accessibility.

Likewise, the location plugin 634*b*, fuel plugin 634*c*, and other plugins 634*n* interface with respective provider(s), such as a HERE geolocation provider 638*b*, an OPIS fuel provider 638*c*, and other providers 638*n*.

FIG. 7A is a diagram 700 illustrating an example embodiment of query 710 representing a voice request. The voice request, in this example, is "Find disabled parking near city hall in san Francisco." The query selects "?PID" (Place Identification), "?NAME" (place name) and "?PRICE" (price of place) from a table given the criteria of the query. The query then needs to solve for the unsolved fields given the defined variables. The query also establishes a soft filter for amenities including an elevator. The soft filter, however, is not a hard requirement of the query, but rather a way to sort results of the other hard requirements. On the other hand, the query establishes a filter for the occupant being a disabled person.

FIG. 7B is a diagram 720 illustrating an example embodiment of identifying candidate plugins based on the query illustrated in FIG. 7A. FIG. 7B illustrates that to solve for ?PID, the system uses a Parking plugin, for ?POI the system using POISearch, and for ?CITY the system uses a Location/geolocation plugin.

Figure 7C:
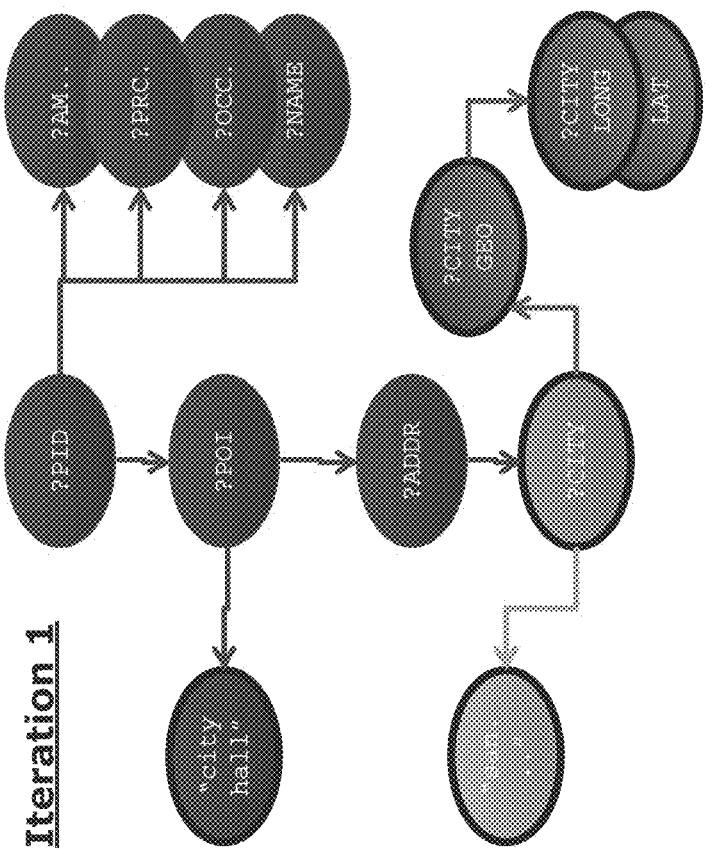
FIG. 7C is a diagram illustrating an example embodiment of constructing a plan to resolve the query by resolving a location of a city, for example.

FIG. 7C is a diagram 750 illustrating an example embodiment of constructing a plan to resolve the query by resolving the location of the city. The plan recognizes that "san Francisco" is a city or town type of location (e.g., ns:location.citytown) and therefore issues a request for a ?CITYGEO variable defined by a latitude ?CITYLAT and longitude ?CITYLONG. Therefore, a provider can provide the ?CITYGEO variable and its subcomponents in response to the lexical "San Francisco." Subsequent iterations (not shown) can search for the point of interest (?POI) of City Hall that is near San Francisco, and then from that point of interest, search for disabled/handicapped accessible parking near City Hall.

Figure 7D:
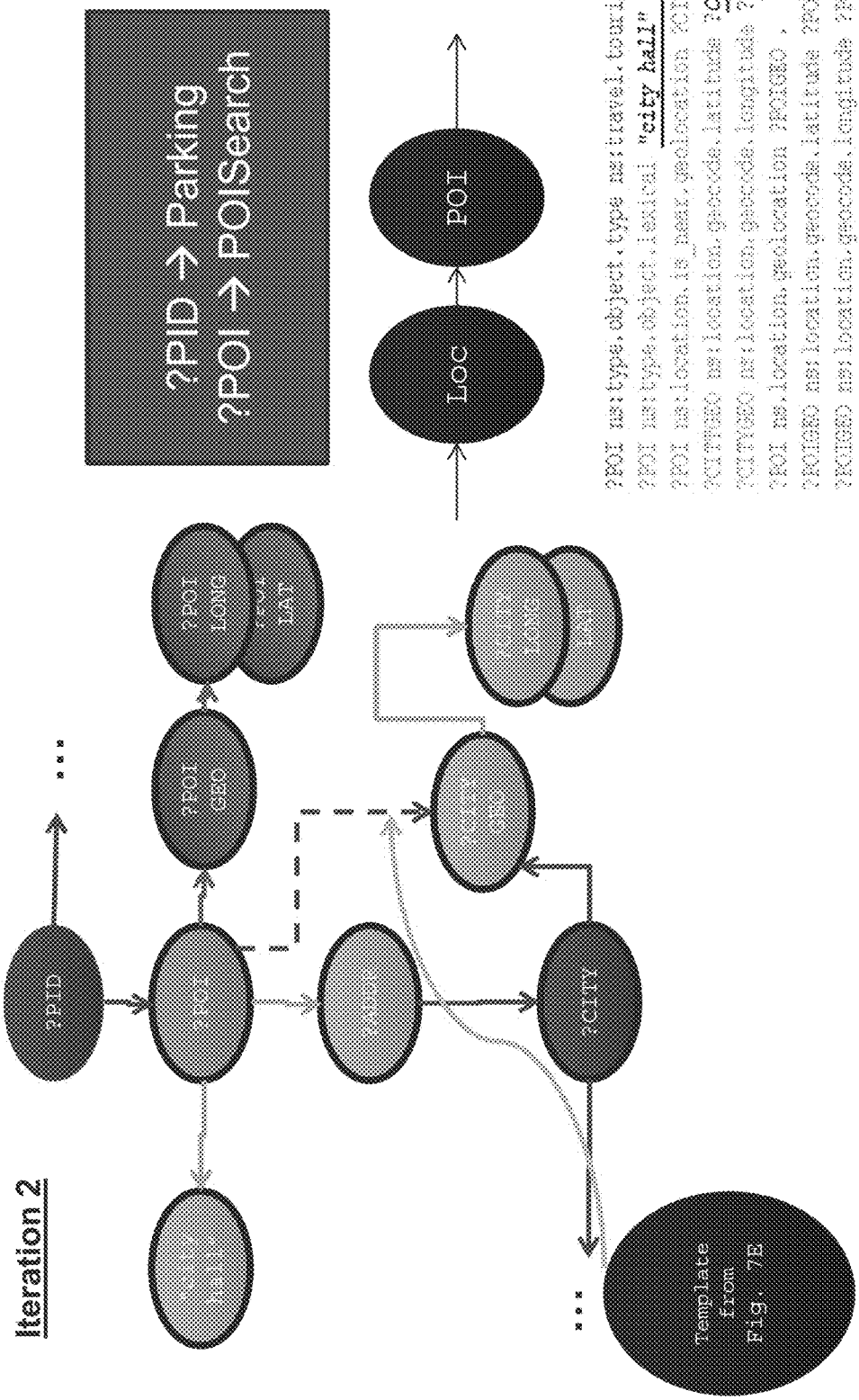
FIG. 7D is a diagram illustrating a subsequent iteration to an iteration of FIG. 7C.

FIG. 7D is a diagram 755 illustrating such a subsequent iteration. With the result for the Location, the point of interest (POI) can be resolved. This is performed by a connection being stitched into the request to the POISearch, as further shown by a template illustrated in FIG. 7E.

Figure 7E:
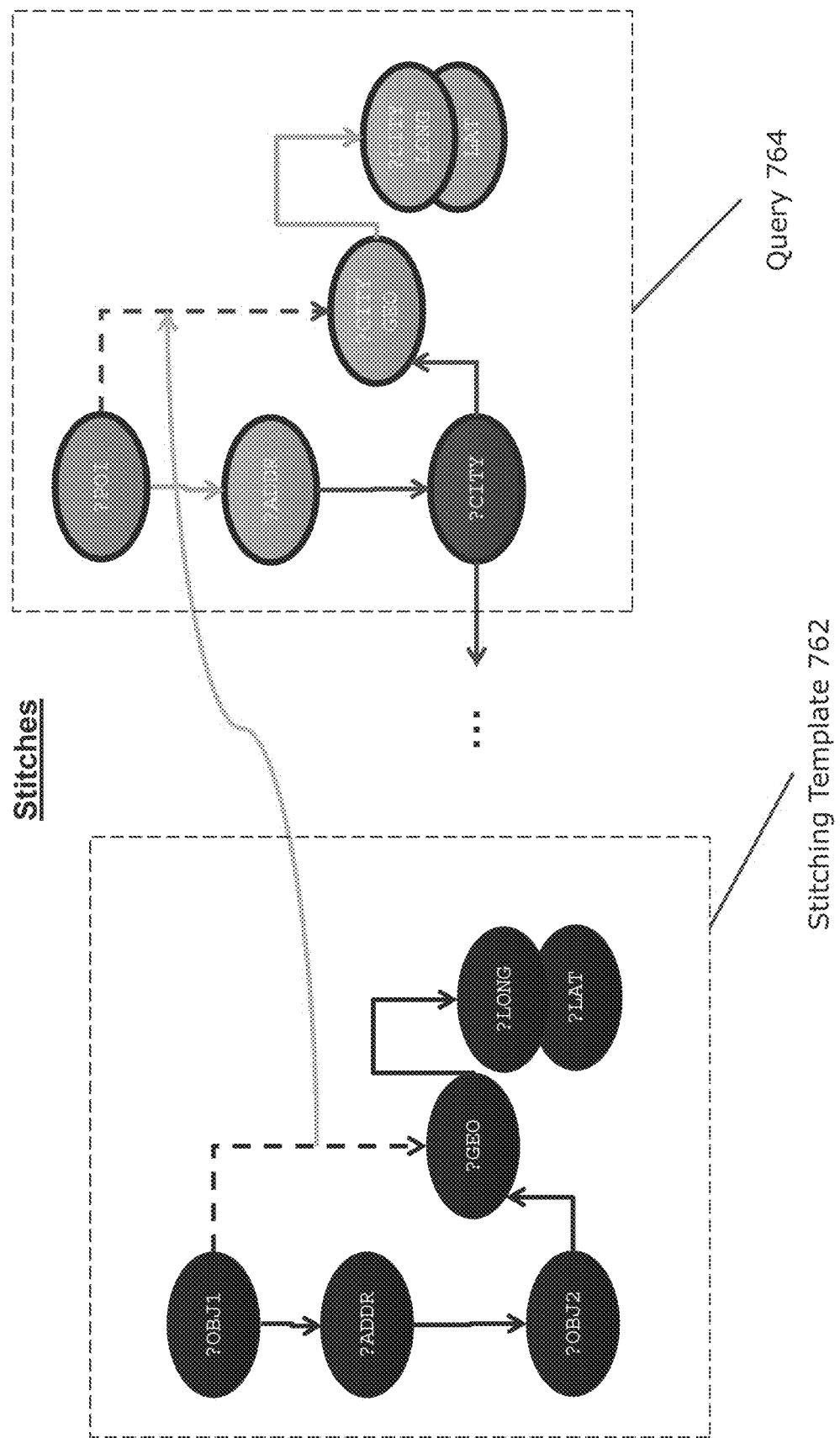
FIG. 7E is a diagram illustrating an embodiment of stitching variables associated with embodiments of FIGS. 7A-D.

FIG. 7E is a diagram 760 illustrating an example embodiment of stitching variables. The stitching template 762 is matched against the query 764. A stitching template is a template of how certain variables are related to each other. Various stitching templates can be available for searching, and in one example can be stored in a database. Each query can be compared to stitching templates to find the best match based on matching variable types and connections between the variables in the query to variable types and connections within each template, and then connections can be copied from the best matching template to the query. Since the pattern of connections and variables in the stitching template 764 matches the fragment of the query 764 starting at the variable ?POI of the query 764, the extra missing connection from the variable ?POI to the variable ?CITYGEO is added. Therefore, when the POI search of FIG. 7D resolves the search for "city hall," it bases the location on the ?LONG and ?LAT of ?CITY.

Figure 7F:
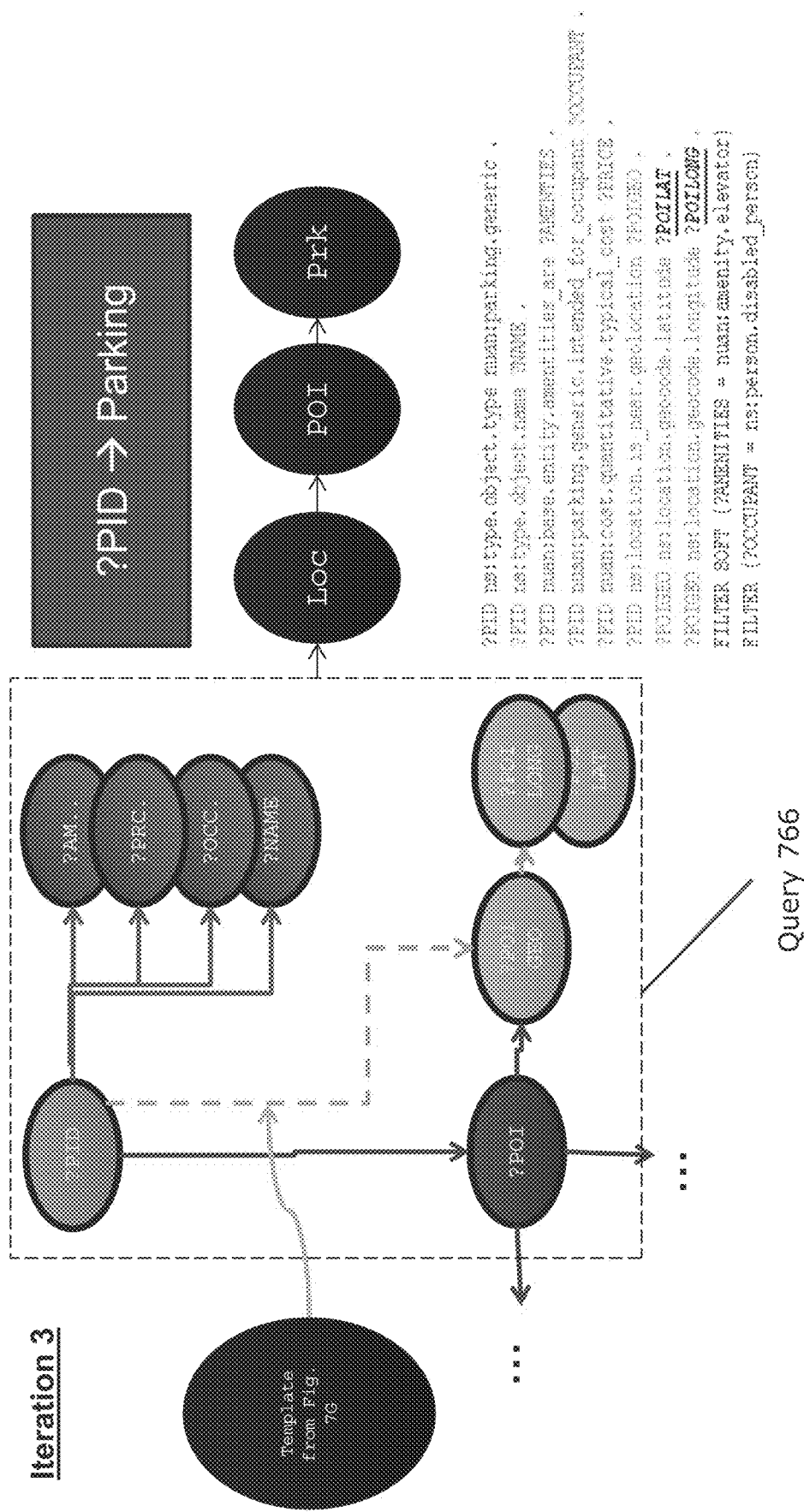
FIG. 7F is a diagram illustrating a third iteration of constructing the plan.

FIG. 7F is a diagram 765 illustrating a third iteration of constructing the plan for the query 766. With the Location of the city and the location of the POI in hand, the plan can develop a search for the final parking venue. The POI of city hall can be passed to the PID search for parking. This can be performed by stitching the connection to the GEO location of OBJ1 of FIG. 7G to the PID search by matching the template from FIG. 7G to the query 766.

Figure 7G:
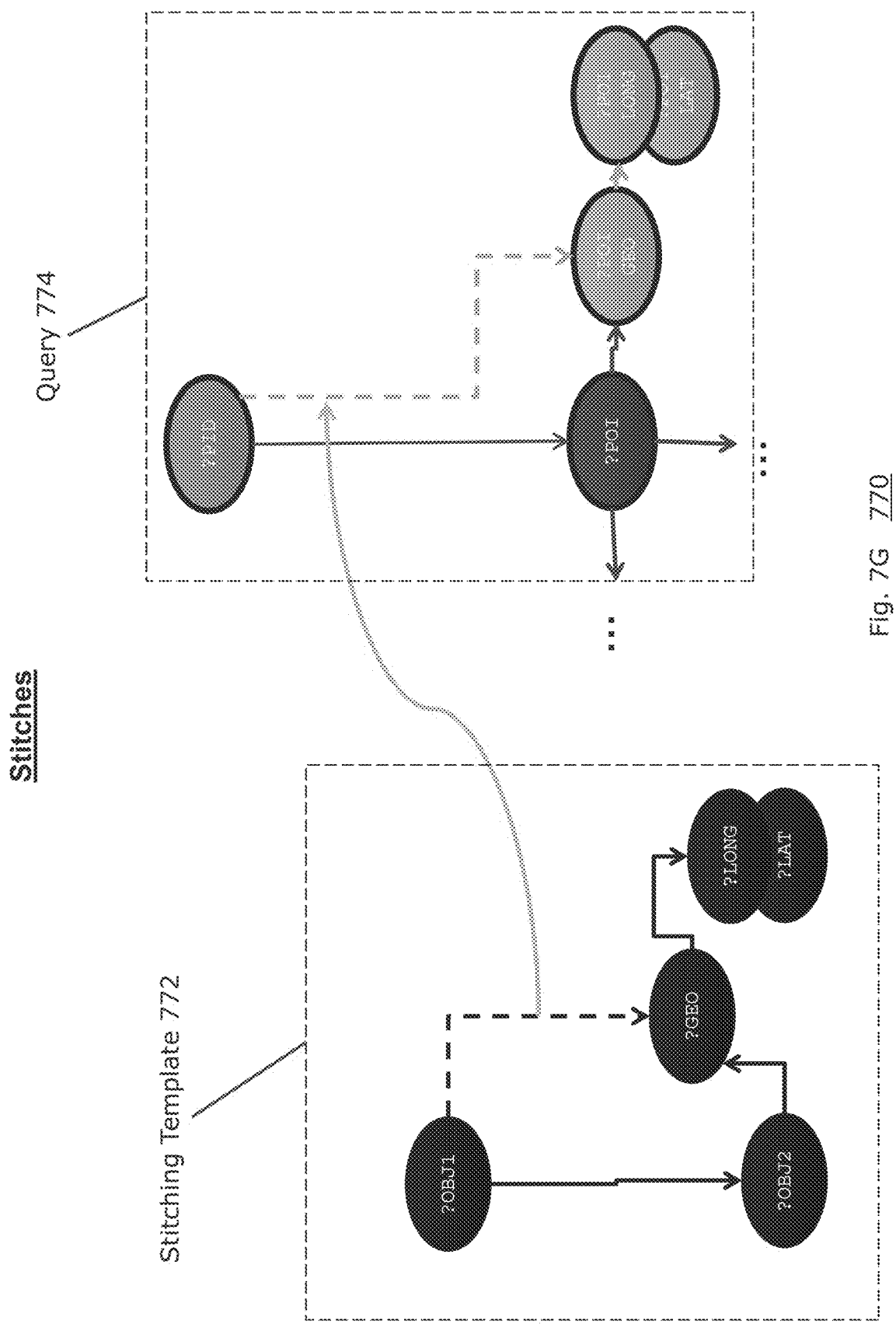
FIG. 7G is a diagram illustrating an example embodiment of stitching variables.

FIG. 7G is a diagram 770 illustrating an example embodiment of stitching variables. In the stitching template 772, ?OBJ1, having a connection to an ?OBJ2 variable which in turn connects to a ?GEO variable and ?LONG and ?LAT variables, is matched to the ?PID of the parking venue. The connection from ?OBJ1 to ?GEO of the stitching template 772 is stitched to connect ?PID and ?POIGEO in the query 774. Therefore, when the POI of the search of FIG. 7F resolves the search for the parking venue, it bases the location on the ?LONG and ?LAT of ?POI, now connected to the variable ?PID, which in this figure represents the final parking venue.

Figure 8:
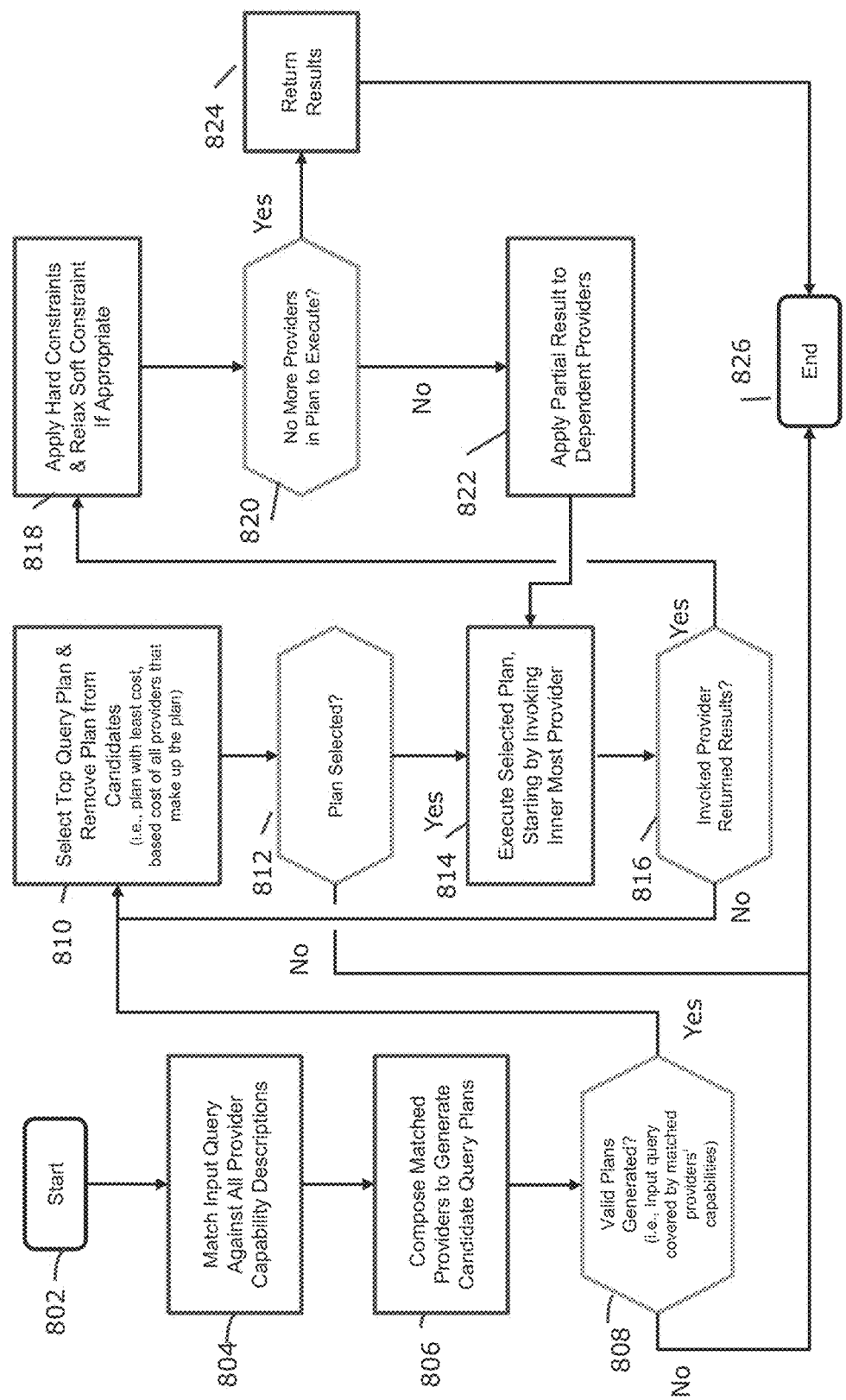
FIG. 8 is a diagram illustrating an example embodiment of a method of implementing the intelligent knowledge layer employed by the present invention.

FIG. 8 is a diagram 800 illustrating an example embodiment of a method of implementing the intelligent knowledge layer/core employed by the present invention. The method begins (802) and matches input query against provider capability descriptions (804). Then, the method composes matched providers to generate candidate query plans (806). The method then determines whether valid plans are generated, for example, by determining whether the input query is covered by matched provider's capabilities (808). If not, the method ends (826).

However, if valid plans are generated (808), the method selects a top query plan and removes plan from the list of candidates (810). The top query plan can be a plan with a lowest cost of using the providers if each provider charges, a plan expected to return a result the fastest based on speed analytics about each provider, etc. If a plan is not selected (812), the method ends (826). However, if a plan is selected (812), the method executes the selected plan, started by invoking the inner most provider of the plan, and applying those results to the outer most provider (814). The inner most provider indicates the provider that does not require results from any other provider. Once the result is provided from the inner most provider, another provider in the chain can provide an answer. If the invoked provider does not return results (816), the method selects the next top query plan and removes that plan from the candidates (810). However, if it does return results, the method then applies hard constraints and relaxes soft constraints when appropriate (818). Then, if no more providers remain in the plan to execute (820), the method returns the results (824) and ends (826). However, if more providers remain, (820), the method applies the partial results to dependent providers (822) and then continues executing the selected plan by invoking the next inner most provider, using the partial results if necessary (814).

Figure 9:
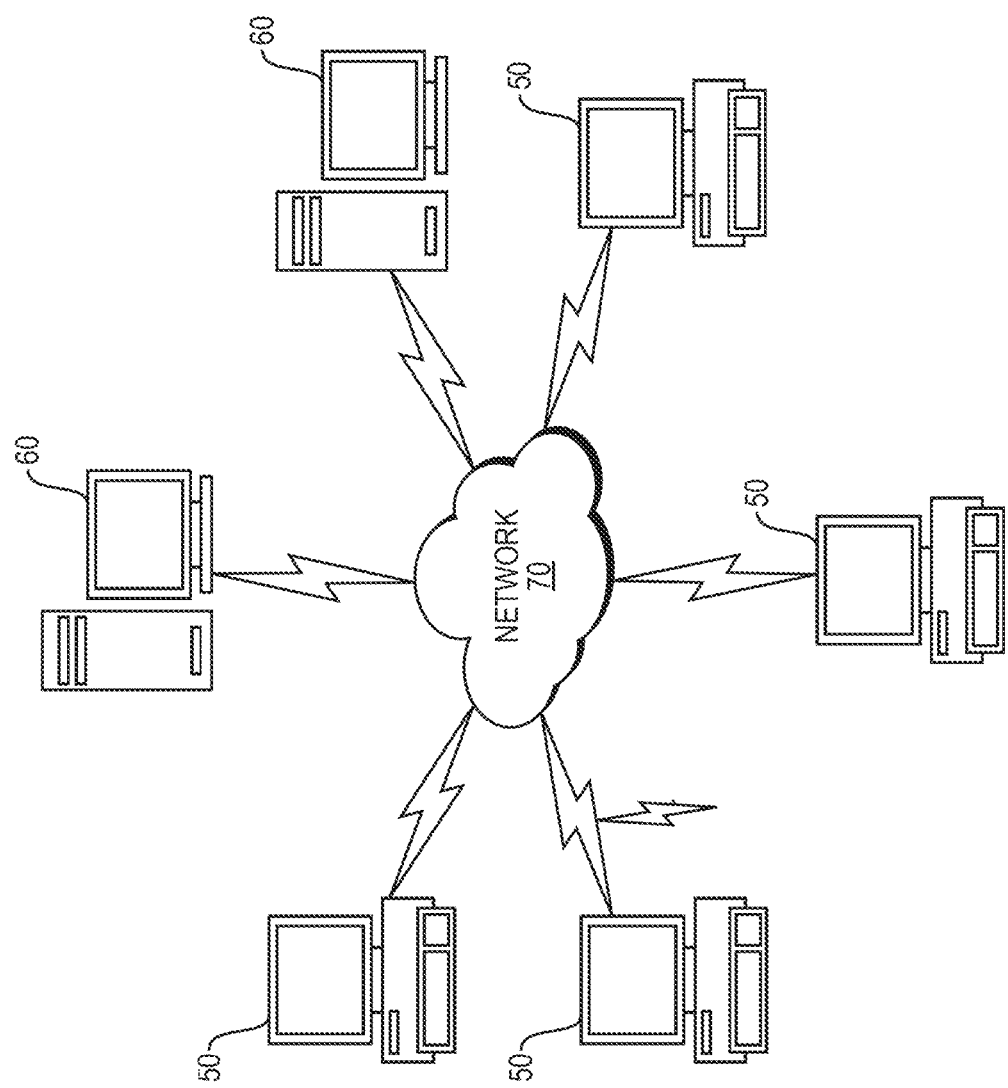
FIG. 9 illustrates a computer network or similar digital processing environment in which embodiments of the present invention may be implemented.

FIG. 9 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 10:
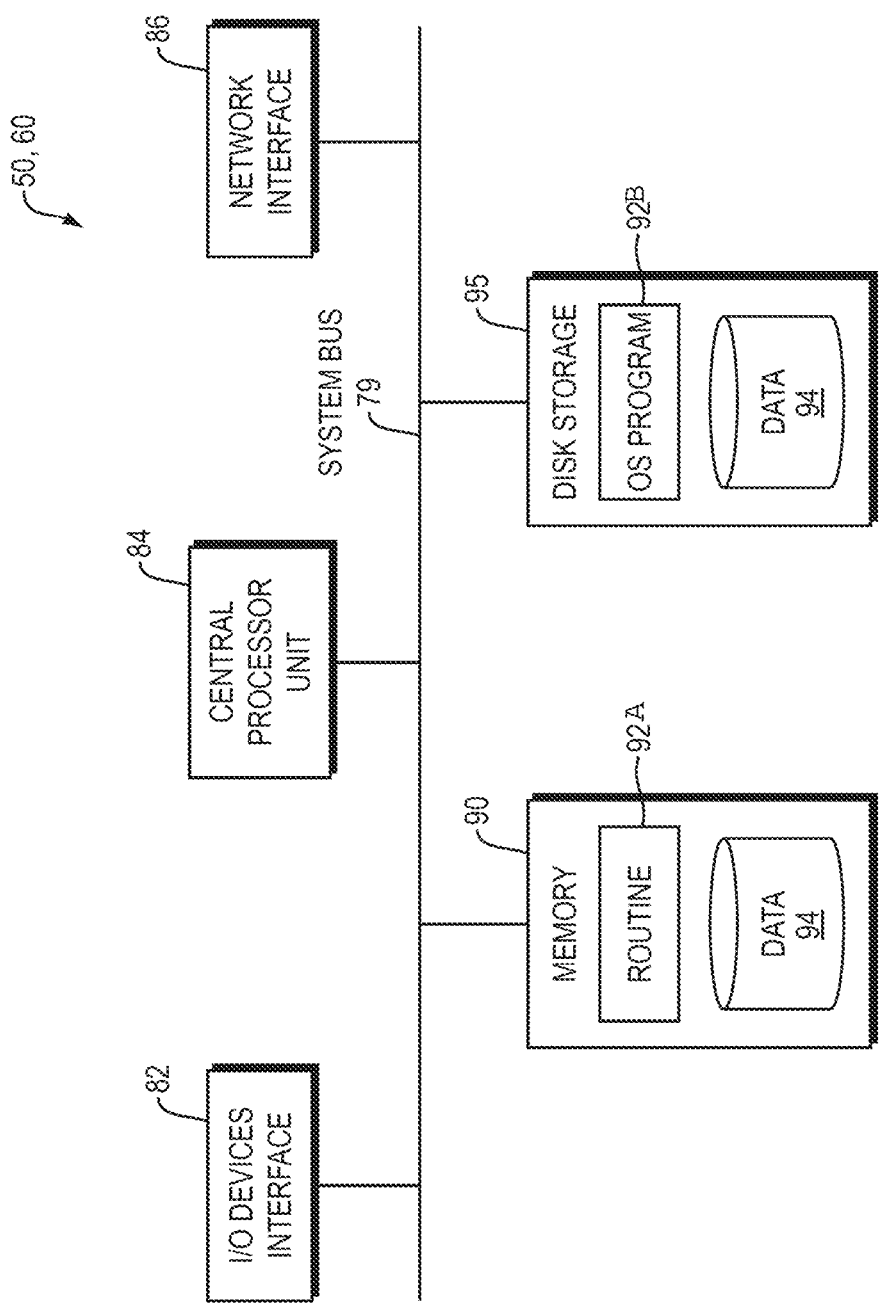
FIG. 10 is a diagram of an example internal structure of a computer (e.g., client processor/device or server computers) in the computer system of FIG. 9.

FIG. 10 is a diagram of an example internal structure of a computer (e.g., client processor/device 50 or server computers 60) in the computer system of FIG. 9. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 9). Memory 90 provides volatile storage for computer software instructions 92 and data 94 used to implement an embodiment of the present invention (e.g., reasoning interface layer, intelligent knowledge/core layer, handler modules, context mapper, reasoning arbitration, consistency checker, meta reasoner, provider plugins, provider arbitration and planning, query execution and knowledge fusion, constraint satisfaction and relaxation, data inference code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method comprising:
matching each portion of a plurality of portions of an updated query, the query being updated from an initial voice query uttered by a user and from contextual information, to corresponding provider capabilities from a database of provider capabilities, each portion including a dimension of information accessible by the corresponding provider;
determining, for each portion of the updated query, the respective provider having accessible for searching the dimension of information of the respective portion to execute each portion of the updated query based on a matched corresponding provider capability and the dimension of information for each portion of the updated query;
generating a chained order to resolve each portion of the updated query using each determined respective provider, the chained order being each portion ascending according to the number of results each portion needs to be resolved;
sending each portion of the updated query, in the chained order, to its respective provider determined to provide a respective result of each respective portion, the respective result having the dimension of information requested by the portion; and
combining results from the plug-in corresponding to each respective provider to form a returned query result.

2. The method of claim 1, wherein combining the results further includes, based on the results from each respective provider, filtering a list of results by applying hard constraints from portions of the updated query, and ranking a list of results based on a priority of soft constraints from portions of the updated query.

3. The method of claim 1, further comprising:
determining whether a first respective provider requires receiving results from a second provider, and, if so, sending appropriate results of the second provider to the first provider as input.

4. The method of claim 1, wherein the respective providers include at least one of the following: a third party content provider application programming interface (API), and a virtual assistant.

5. The method of claim 1, further comprising providing a semantic description corresponding to each respective provider, wherein determining a respective provider to execute the portion of the updated query includes determining whether the portion of the updated query includes a request for a resource described by the semantic description corresponding to the respective provider.

6. The method of claim 1, further comprising constructing a plan that includes an order of invoking each respective provider.

7. The method of claim 1, wherein combining results from each respective provider to return a query result further includes:
determining a first result from a first provider; and
sending the first result to a second provider as part of the portion of the query to the second provider;
wherein the first result from the first provider is employed to resolve the portion of the query to the second provider.

8. The method of claim 1, further comprising relaxing at least one portion of the query if a combination of fields or values of the query produces an incompatible result.

9. The method of claim 1, further comprising:
comparing variables and connections between variables of an updated query to variables and connections between variables to at least one stitching template to find a best matching stitching template;
finding a connection present in the best matching stitching template from a first template variable to a second template variable that is absent in the portion of the updated query between a first query variable and a second query variable, the first query variable and second query variable corresponding to the first template variable and second template variable; and
copying at least one connection from the stitching template to the portion of the query between the first query variable and second query variable.

10. A system comprising:

a processor; and a memory with computer code instructions stored therein, the memory operatively coupled to said processor such that the computer code instructions configure the processor to implement:

a planning module configured to:

match each portion of a plurality of portions of an updated query, the query being updated from an initial voice query uttered by a user and contextual information, to corresponding provider capabilities from a database of provider capabilities, each portion including a dimension of information accessible by the corresponding provider, and determine, for each portion of the received voice query, the respective provider having accessible for searching the dimension of information of the respective portion to execute each portion of the updated query based on the respective matched provider capability and the dimension of information for each portion of the updated query;

generate a chained order to resolve each portion of the updated query using each determined respective provider, the chained order being each portion ascending according to the number of results each portion needs to be resolved;

a query execution module configured to:

send each portion of the updated query, in the chained order, to its respective provider determined to provide a respective result of each respective portion, the respective result having the dimension of information requested by the portion, and combine results from the plug-in corresponding to each respective provider to form a returned query result.

11. The system of claim 10, wherein combining the results further includes, based on the results from each respective provider, filtering a list of results by applying hard constraints from portions of the updated query, and ranking a list of results based on a priority of soft constraints from portions of the updated query.

12. The system of claim 10, wherein:

the planning module is further configured to determine whether a first provider requires receiving results from a second provider, and, the query execution module is configured to, if the first provider requires receiving results from the second provider, send appropriate results of the second provider to the first provider as input.

13. The system of claim 10, wherein the respective providers include at least one of the following: a third party content provider application programming interface (API), and a virtual assistant.

14. The system of claim 10, wherein the planning module is provided a semantic description corresponding to each respective provider, and determining a respective provider to execute the portion of the updated query includes determining whether the portion of the updated query includes a request for a resource described by the semantic description corresponding to the respective provider.

15. The system of claim 10, wherein the planning module is further configured to construct a plan that includes an order of invoking each respective provider.

16. The system of claim 10, wherein the query execution module is further configured to combine results from each respective provider to return a query result by:

determining a first result from a first provider; and sending the first result to a second provider as part of the portion of the query to the second provider;

wherein the first result from the first provider is employed to resolve the portion of the query to the second provider.

17. The system of claim 10, further comprising constraint relaxation module configured to relax at least one portion of the query if a combination of fields or values of the query produces an incompatible result.

18. The system of claim 10, wherein the planning module is further configured to:

compare variables and connections between variables of a updated query to variables and connections between variables to at least one stitching template to find a best matching stitching template;

find a connection present in the best matching stitching template from a first template variable to a second template variable that is absent in the portion of the updated query between a first query variable and a second query variable, the first query variable and second query variable corresponding to the first template variable and second template variable; and copy at least one connection from the stitching template to the portion of the query between the first query variable and second query variable.

19. The method of claim 1, wherein the dimension of information is a dimension of contextual information.

20. The system of claim 10, wherein the dimension of information is a dimension of contextual information.

* * * * *